United States Patent
Nakagawa et al.

(10) Patent No.: US 10,059,793 B2
(45) Date of Patent: Aug. 28, 2018

(54) LIGNIN RESIN COMPOSITION, CURED PRODUCT, AND MOLDED PRODUCT

(71) Applicant: SUMITOMO BAKELITE CO., LTD., Tokyo (JP)

(72) Inventors: Hiroshige Nakagawa, Tokyo (JP); Mitsutaka Matsumoto, Tokyo (JP); Taketoshi Murai, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 15/524,349

(22) PCT Filed: Nov. 18, 2015

(86) PCT No.: PCT/JP2015/082467
§ 371 (c)(1),
(2) Date: May 4, 2017

(87) PCT Pub. No.: WO2016/080469
PCT Pub. Date: May 26, 2016

(65) Prior Publication Data
US 2017/0342188 A1  Nov. 30, 2017

(30) Foreign Application Priority Data

Nov. 20, 2014  (JP) .................... 2014-235142

(51) Int. Cl.
  *C08L 97/00* (2006.01)
  *C08G 8/24* (2006.01)
  *C07G 1/00* (2011.01)

(52) U.S. Cl.
  CPC ............... *C08G 8/24* (2013.01); *C07G 1/00* (2013.01); *C08L 97/005* (2013.01)

(58) Field of Classification Search
  CPC .................. C08G 8/24; C07G 1/00
  USPC .......................................... 524/73
  See application file for complete search history.

(56) References Cited

U.S. PATENT DOCUMENTS

2013/0225719 A1* 8/2013 Kuroe ................ F16D 69/026
                                                           523/149
2016/0215143 A1   7/2016 Gotou et al.

FOREIGN PATENT DOCUMENTS

| GB | 1601751 A | 11/1981 |
|---|---|---|
| JP | 62-56193 B2 | 11/1987 |
| JP | 2007-533891 A | 11/2007 |
| JP | 2008-156601 A | 7/2008 |
| JP | 2009-227890 A | 10/2009 |
| JP | 2012-82255 A | 4/2012 |
| JP | 2013-53205 A | 3/2013 |
| JP | 2013-173882 A | 9/2013 |
| JP | 2013-227470 A | 11/2013 |
| JP | 2014-125595 A | 7/2014 |
| JP | 2015-48360 A | 3/2015 |
| JP | 2015-174894 A | 10/2015 |
| WO | 2004/101982 A2 | 11/2004 |
| WO | 2015/046588 A1 | 4/2015 |
| WO | 2015/178103 A1 | 11/2015 |

OTHER PUBLICATIONS

International Search Report dated Jan. 12, 2016, issued in counterpart International Application No. PCT/JP2015/082467 (2 pages).

* cited by examiner

*Primary Examiner* — Hui Chin
(74) *Attorney, Agent, or Firm* — Westerman, Hattori, Daniels & Adrian, LLP

(57) ABSTRACT

Provided is a lignin resin composition including a lignin derivative having a weight-average molecular weight of 500 or more and 4000 or less and a novolac-type phenolic resin having a weight-average molecular weight of 1000 or more and 3000 or less, in which the content of the lignin derivative is not higher than the content of the novolac-type phenolic resin. In particular, the cured product (molded product) of a lignin resin composition obtained by melt-mixing such a lignin resin composition, adding hexamethylenetetramine thereto and then heating the resulting mixture has a high bending strength. Such a lignin resin composition is utilizable as a thermosetting resin substituting a phenolic resin.

8 Claims, No Drawings

LIGNIN RESIN COMPOSITION, CURED PRODUCT, AND MOLDED PRODUCT

TECHNICAL FIELD

The present invention relates to a lignin resin composition and a method for producing the same, a cured product of a lignin resin composition, and a molded product using the cured product.

BACKGROUND ART

As with concern about the depletion of oil resources, there is an urgent need for the development of a plant-derived resin from petroleum. With respect to the plant-derived resin, attention has been paid to a lignin derivative obtained from pulp by-product lignin and a lignin derivative obtained from a subcritical water treatment of biomass, a so-called organosolv type lignin derivative obtained by digestion of biomass using an organic solvent, and lignin by-produced from bio-ethanol production processes. Hexamethylenetetramine, known as a curing agent for a novolac-type phenolic resin, is added to the obtained lignin derivative which is then cured by heating, whereby it is possible to obtain a lignin resin cured product (see PTL 1).

However, a cured product obtained by adding hexamethylenetetramine to a single lignin derivative, followed by curing, has suffered from a problem of a lower bending strength as compared to a molded article of a novolac-type phenolic resin.

CITATION LIST

Patent Literature

[PTL 1] PCT Japanese Translation Patent Publication No. 2007-533891

SUMMARY OF INVENTION

Technical Problem

An object of the present invention is to provide a method capable of obtaining a lignin resin composition having a higher bending strength than a molded article of a 100% novolac-type phenolic resin.

Solution to Problem

The foregoing object is achieved by the following present inventions (1) to (8).

(1) A lignin resin composition including a lignin derivative having a weight-average molecular weight of 500 or more and 4000 or less and a novolac-type phenolic resin having a weight-average molecular weight of 1000 or more and 3000 or less, in which the content of the lignin derivative is not higher than the content of the novolac-type phenolic resin.

(2) The lignin resin composition according to (1), in which the weight ratio of the lignin derivative to the novolac-type phenolic resin is 5:95 to 50:50.

(3) The lignin resin composition according to (1) or (2), in which the lignin derivative is solvent-soluble.

(4) The lignin resin composition according to any one of (1) to (3), in which the solvent is a polar solvent.

(5) The lignin resin composition according to any one of (1) to (4), in which the softening temperature of the novolac-type phenolic resin is 60° C. or higher and 95° C. or lower.

(6) The lignin resin composition according to any one of (1) to (5), which is formed by melt-mixing the lignin derivative and the novolac-type phenolic resin at a temperature of 60° C. or higher and 250° C. or lower in advance.

(7) A cured product obtained by adding hexamethylenetetramine to the lignin resin composition according to any one of (1) to (6), followed by curing.

(8) A molded product having the cured product according to (7).

Advantageous Effects of Invention

According to the present invention, by setting weight-average molecular weights and contents of a lignin derivative and a novolac-type phenolic resin to be contained in a lignin resin composition to fall within predetermined ranges, it is possible to improve a bending strength of a cured product using such a lignin resin composition and of a molded product using such a cured product.

DESCRIPTION OF EMBODIMENTS

Hereinafter, a lignin resin composition, a cured product and a molded product of the present invention will be described in detail with reference to preferred embodiments.

The lignin resin composition of the present invention contains a lignin derivative and a novolac-type phenolic resin (phenolic novolac resin).

In the present specification, a relatively low molecular weight lignin derived from a relatively high molecular weight lignin contained in the biomass is referred to as a "lignin derivative".

Hereinafter, individual components constituting the lignin resin composition of the present invention will be described.

The lignin derivative used in the present invention is not particularly limited as long as it is a lignin derivative having a weight-average molecular weight of 500 or more and 4000 or less. Such a lignin derivative is preferably a lignin derivative obtained by decomposition of biomass, followed by solvent extraction if necessary, or a so-called organosolv type lignin derivative obtained by digestion of biomass using an organic solvent. As an example, it is possible to obtain a lignin derivative by the method described in US Patent US2010/0305241 A1 or Japanese Laid-open Patent Publication No. 2011-042806.

Since a lignin derivative having such a weight-average molecular weight has a good reactivity (curability) with a novolac-type phenolic resin, the strength of a molded product obtained by molding such a lignin resin composition is improved.

The weight-average molecular weight of the lignin derivative used in the present invention is preferably 800 or more and 3800 or less and more preferably 1000 or more and 3500 or less. When the weight-average molecular weight of the lignin derivative is within the above-specified range, the reactivity of the lignin derivative with the novolac-type phenolic resin is further improved, which in turn can further improve the bending strength of a molded product obtained by using a lignin resin composition.

Further, the lignin derivative used in the present invention may be preferably a solvent-soluble lignin derivative.

Uniform dispersion of the solvent-soluble lignin derivative in the novolac-type phenolic resin results in an improved strength of the resulting lignin resin composition.

Since the composition of the total lignin resin composition becomes uniform by minimizing the size of the lignin derivative (particles of the lignin derivative) to be used, the bending strength of the lignin resin composition can be stabilized. Since the solvent-soluble lignin derivative is melted even when heated, the lignin derivative can be made into micron-sized particles by means of an operation such as melt-mixing and then can be uniformly dispersed in the novolac-type phenolic resin.

The solvent as used herein is not particularly limited. Preferred is a polar solvent. In particular, a solution containing tetrahydrofuran or acetone may be suitably used.

Examples of other lignin derivatives that can be used in the present invention include pulp lignin such as kraft lignin, soda lignin, or lignin sulfonic acid, lignophenol, and phenolized lignin.

The kraft lignin is a lignin derivative having a modified molecular structure after taking out carbohydrates such as cellulose from wood, for example, in the paper pulp industry. The lignin sulfonic acid is a polymer electrolyte having a functional group such as a sulfone group, a carboxy group, or a phenolic hydroxyl group, and there are no limitations on the molecular weight, the production process and the like of the lignin sulfonic acid.

The lignophenol can be obtained, for example, by a treatment of lignin in lignocellulosic materials with a phenol derivative. There is no particular limitation on the structure of the lignophenol.

The phenolized lignin is lignin in a state stabilized by chemical bonding of a phenol derivative to a molecular chain in lignin when a tree or plant material is subjected to an acid treatment so that lignin and cellulose are separated from each other.

Further, the lignin derivative used in the present invention may be a commercially available lignin derivative.

Next, the novolac-type phenolic resin will be described.

The novolac-type phenolic resin used in the present invention is not particularly limited as long as it has a weight-average molecular weight of 1000 or more and 3000 or less. Here, the weight-average molecular weight is a value in terms of polystyrene.

If the weight-average molecular weight of the novolac-type phenolic resin is higher than 3000, this results in poor miscibility between the novolac-type phenolic resin and the lignin derivative. Consequently, a molded product obtained by using such a novolac-type phenolic resin breaks starting from a place where dispersion by mixing is not good when carrying out a bending test, so it is undesirable in that a high strength of the molded product is not achieved. On the other hand, if the weight-average molecular weight is less than 1000, it is difficult to apply a shear force to a mixture when mixing a novolac-type phenolic resin and a lignin derivative. This leads to a poor dispersibility of the lignin derivative into the novolac-type phenolic resin, so it is undesirable in that a high-strength molded product cannot be obtained as in the case where the weight-average molecular weight of the novolac-type phenolic resin is too high.

In view of the foregoing, the weight-average molecular weight of the novolac-type phenolic resin is preferably 1200 or more and 2500 or less, and more preferably 1400 or more and 2000 or less. If the weight-average molecular weight of the novolac-type phenolic resin is within the above-specified range, the miscibility between the novolac-type phenolic resin and the lignin derivative and the dispersibility of the lignin derivative into the novolac-type phenolic resin are improved, whereby the bending strength of a molded product obtained by using a lignin resin composition can be further improved.

The weight-average molecular weight that can be used may be a value in terms of standard polystyrene, as measured by gel permeation chromatography (GPC).

Further, the softening temperature of the novolac-type phenolic resin is preferably 60° C. or higher and 95° C. or lower. If the softening temperature of the novolac-type phenolic resin is within the above-specified range, it may be possible to achieve of mixing (melt-mixing) the novolac-type phenolic resin and the lignin derivative at a relatively low temperature (about 60° C. to 250° C.). Further, since it is possible to mix the novolac-type phenolic resin and the lignin derivative at a relatively low temperature, the viscosity of the mixture is prevented from becoming too low upon mixing, so that it is possible to apply a sufficient shear force to the mixture. As a result, the lignin derivative can be more uniformly dispersed into the novolac-type phenolic resin.

The method of measuring a softening point may be carried out according to JIS K 2207 using a ring and ball softening point tester (manufactured by Meitec Corporation).

Further, in the lignin resin composition of the present invention, the content of the lignin derivative is not higher than the content of the novolac-type phenolic resin. More specifically, the weight ratio of the lignin derivative to the novolac-type phenolic resin is preferably 5:95 to 50:50, more preferably 5:95 to 40:60, and still more preferably 10:90 to 30:70. In the case where the weight ratio of the novolac-type phenolic resin is less than 50%, there is a possibility that the bending strength of the resulting molded product will be decreased due to increased breakage points when performing a bending test of such a product, depending on the value of the weight-average molecular weight of the novolac-type phenolic resin. On the other hand, if the weight ratio of the novolac-type phenolic resin is higher than 95%, there is a possibility that the rigid function of the lignin derivative cannot be fully exhibited due to a high ratio of novolac-type phenolic resin, depending on the value of the weight-average molecular weight of the novolac-type phenolic resin. In this case, there is a possibility that the bending strength becomes not different from that of a molded product made from a novolac-type phenolic resin, that is, a molded product made from a resin composition having a weight ratio of a novolac-type phenolic resin of 100%.

In order to more uniformly disperse the lignin derivative into the novolac-type phenolic resin and reliably exert the rigidity of the lignin derivative to thereby obtain a higher bending strength than that of a molded product made of a 100% novolac-type phenolic resin, it is preferred to carry out melt-mixing of a mixture of the lignin derivative and the novolac-type phenolic resin in advance. By carrying out melt-mixing of the mixture in advance, the lignin derivative can be more uniformly dispersed into the novolac-type phenolic resin.

More specifically, it is preferred to carry out melt-mixing using a heating platen. The temperature of the heating platen is preferably 60° C. or higher which is higher than the softening temperature of the novolac-type phenolic resin. Incidentally, the softening temperature of the novolac-type phenolic resin may be measured according to JIS K2207 using an automatic ring and ball type softening point tester (manufactured by Meitec Corporation) as described above. In the case where the temperature of the heating platen is lower than 60° C., it is undesirable because the novolac-type phenolic resin is not melted and therefore melt-mixing cannot be carried out. If the temperature of the heating platen is higher than 250° C., it is also undesirable because the viscosity of the novolac-type phenolic resin becomes too low, thus resulting in poor dispersion of the lignin derivative into the novolac-type phenolic resin.

In the present invention, a curing agent may be added to the lignin resin composition. Because of easy availability and high versatility, it is preferred to use hexamethylenetetramine as the curing agent.

By adding a curing agent, the lignin resin composition can be obtained as a cured product.

Further, a molding material can be obtained by adding an inorganic filler such as silica or chopped glass, a coupling agent of an inorganic filler, a pigment, a thickener or the like to the above-mentioned lignin resin composition, followed by heating and kneading. In addition, it is possible to improve moldability of the lignin resin composition by adding an epoxy resin to the lignin resin composition. Further, raw materials other than an epoxy resin may also be used. Further, the resulting molded product may be subjected to a post-curing treatment at a temperature higher than the molding temperature.

The lignin resin composition of the present invention is characterized by containing the foregoing lignin derivative and novolac-type phenolic resin, but may contain a curing agent, a crosslinking agent, or the like, in addition to them.

The method for producing such a lignin resin composition includes a step of kneading a lignin derivative and a novolac-type phenolic resin. If necessary, an optional component may be premixed and then kneaded. Further, even in the case where the lignin resin composition contains a filler, a crosslinking agent, an antioxidant, and other additives, the order of kneading those ingredients is not particularly limited.

Examples of the kneader include a Banbury mixer, a kneader, and rolls.

When kneading, an organic solvent may be used, if necessary. The organic solvent is not particularly limited. Examples of the organic solvent include methanol, ethanol, propanol, butanol, methyl cellosolve, acetone, methyl ethyl ketone, methyl isobutyl ketone, N,N-dimethylformamide, N,N-dimethylacetamide, N-methyl-2-pyrrolidone, quinoline, cyclopentanone, m-cresol, and chloroform. These solvents may be used alone or in combination of two or more thereof. Further, the solid content concentration in the lignin resin composition is not particularly limited, but is about 60 to 98 mass % as an example, and preferably about 70 to 95 mass %.

In order to mix a modified novolac resin with lignin, kneading may be carried out as described above, but lignin may be added to the reactor after a modified novolac resin has been obtained by the reaction, followed by melt-mixing. In the case where lignin is obtained from the decomposition of biomass, a modified novolac resin may be charged into the reactor after the decomposition of biomass, followed by melt-mixing.

As an example of the production method, the lignin resin composition can be obtained as a mixed resin by mixing a lignin resin and modified novolac resin using a mixing machine such as a hot plate, a mixer or a roll.

Next, a molding material will be described. The molding material obtained by using the foregoing lignin resin composition is applied to, for example, applications such as semiconductor parts, aircraft parts, automotive parts, industrial machine parts, electronic parts, electric parts, mechanism elements, and rubber products.

The molding method is not particularly limited. The molding material of the present invention may be famed into a molded article using a known molding method such as an injection molding, compression molding, extrusion molding or cast molding method. The thus obtained molded article may be in any from. For example, the obtained molded article may be an intermediate molded article before shaping of the molding material into a final molded article or may be a final molded article.

EXAMPLES

Hereinafter, the present invention will be described in detail with reference to Examples and Comparative Examples, but the present invention is not limited thereto.

Example 1

First, a lignin derivative (I) was prepared in the following manner.

4000 g of water and 700 g of Japanese cedar sawdust were placed in an autoclave, and a subcritical water treatment was carried out at 230° C. for 1 hour. Thereafter, the treated material was filtered to obtain solids which were then immersed in acetone, followed by further filtration. Evaporation of the acetone solution after filtration was carried out to give 100 g of the lignin derivative (I). The weight-average molecular weight of the resulting lignin derivative was 810 in terms of polystyrene.

Then, a novolac-type phenolic resin (I) was prepared in the following manner.

100 parts by mass of phenol, 45 parts by mass of paraformaldehyde and 1 part by mass of oxalic acid were added to a three-neck flask. The mixture was allowed to react at 80° C. for 8 hours to obtain a novolac-type phenolic resin (I). The composition of the resulting novolac-type phenolic resin (I) was 91 mass % of a phenolic resin and 9 mass % of water. Further, the novolac-type phenolic resin (I) was found to have a weight-average molecular weight of 1430 in terms of polystyrene and a softening temperature of 87° C.

Next, 100 parts by mass of the novolac-type phenolic resin (I) and 5.5 parts by mass of the lignin derivative (I) were subjected to melt-mixing on a heating platen at 200° C. for 10 minutes. The resulting mixture was cooled and then pulverized to obtain a resin component.

50.5 parts by mass of a glass fiber (glass milled fiber [manufactured by Nitto Boseki Co., Ltd., reference fiber diameter: 10±1.5 µm, and average fiber length: 90 µm]) and 15 parts by mass of hexamethylenetetramine were added to 100 parts by mass of the resulting resin component which was then kneaded in a LABO PLASTOMILL under the conditions of a kneading temperature: 90° C. and a rotational speed: 50 rpm to obtain a resin composition (lignin resin composition). The resulting resin composition was subjected to compression molding under the conditions of a molding temperature: 175° C. and a molding time: 3 min to give a bending strength test piece which is a resin molded article having a width of 10 mm, a length of 100 mm, and a height of 4 mm.

Example 2

100 parts by mass of a novolac-type phenolic resin (I) and 11 parts by mass of HP-Lignin (manufactured by Lignol Co., Ltd., weight-average molecular weight of 3300 in terms of polystyrene. Hereinafter, simply referred to as "lignin derivative (II)") as a lignin derivative were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

Example 3

100 parts by mass of a novolac-type phenolic resin (I) and 33 parts by mass of a lignin derivative (II) were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

Example 4

100 parts by mass of a novolac-type phenolic resin (I) and 66 parts by mass of a lignin derivative (II) were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

Example 5

100 parts by mass of phenol, 45 parts by mass of paraformaldehyde and 1 part by mass of oxalic acid were added to a three-neck flask. The mixture was allowed to react at 80° C. for 7 hours and 30 minutes to obtain a novolac-type phenolic resin (II). The composition of the resulting novolac-type phenolic resin (II) was 90 mass % of a phenolic resin and 10 mass % of water. Further, the novolac-type phenolic resin (II) was found to have a weight-average molecular weight of 1360 in terms of polystyrene and a softening temperature of 86° C.

Next, 100 parts by mass of the novolac-type phenolic resin (II) and 33 parts by mass of a lignin derivative (II) were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

Example 6

100 parts by mass of phenol, 45 parts by mass of paraformaldehyde and 1 part by mass of oxalic acid were added to a three-neck flask. The mixture was allowed to react at 80° C. for 7 hours to obtain a novolac-type phenolic resin (III). The composition of the resulting novolac-type phenolic resin (III) was 89 mass % of a phenolic resin and 11 mass % of water. Further, the novolac-type phenolic resin (III) was found to have a weight-average molecular weight of 1120 in tams of polystyrene and a softening temperature of 84° C.

Next, 100 parts by mass of the novolac-type phenolic resin (III) and 33 parts by mass of a lignin derivative (II) were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

Example 7

100 parts by mass of phenol, 45 parts by mass of paraformaldehyde and 1 part by mass of oxalic acid were added to a three-neck flask. The mixture was allowed to react at 80° C. for 9 hours to obtain a novolac-type phenolic resin (IV). The composition of the resulting novolac-type phenolic resin (IV) was 91 mass % of a phenolic resin and 9 mass % of water. Further, the novolac-type phenolic resin (IV) was found to have a weight-average molecular weight of 2480 in terms of polystyrene and a softening temperature of 84° C.

Next, 100 parts by mass of the novolac-type phenolic resin (IV) and 33 parts by mass of a lignin derivative (II) were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

Example 8

100 parts by mass of phenol, 45 parts by mass of paraformaldehyde and 1 part by mass of oxalic acid were added to a three-neck flask. The mixture was allowed to react at 80° C. for 10 hours to obtain a novolac-type phenolic resin (V). The composition of the resulting novolac-type phenolic resin (V) was 89 mass % of a phenolic resin and 11 mass % of water. Further, the novolac-type phenolic resin (V) was found to have a weight-average molecular weight of 2900 in terms of polystyrene and a softening temperature of 99° C.

Next, 100 parts by mass of the novolac-type phenolic resin (V) and 100 parts by mass of a lignin derivative (II) were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

Comparative Example 1

A resin composition and a resin molded article were obtained in the same manner as in Example 1, except that a lignin derivative (I) was not used as a constituent material of the resin component, and subjected to a bending strength test.

Comparative Example 2

100 parts by mass of phenol, 45 parts by mass of paraformaldehyde and 1 part by mass of oxalic acid were added to a three-neck flask. The mixture was allowed to react at 80° C. for 12 hours to obtain a novolac-type phenolic resin (VI). The composition of the resulting novolac-type phenolic resin (VI) was 86 mass % of a phenolic resin and 14 mass % of water. Further, the novolac-type phenolic resin (VI) was found to have a weight-average molecular weight of 7240 in terms of polystyrene and a softening temperature of 105° C.

Next, 100 parts by mass of the novolac-type phenolic resin (VI) and 33 parts by mass of a lignin derivative (II) were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

Comparative Example 3

100 parts by mass of a novolac-type phenolic resin (I) and 150 parts by mass of a lignin derivative (II) were subjected to melt-mixing on a heating platen at 200° C. for 10 minutes. The resulting mixture was cooled and then pulverized to obtain a resin component. Thereafter, a resin composition and a resin molded article were obtained in the same manner as in Example 1 and subjected to a bending strength test.

(Test Method)

1. Bending Strength

For test pieces of Examples 1 to 8 and Comparative Examples 1 to 3, the bending strength at room temperature (about 23±2° C.) and 170° C. was measured in accordance with JIS K6911. The measurement of the bending strength was carried out using an Autograph AG-X—and an environmental tester TCE-N300 (both manufactured by Shimadzu Corporation). It should be noted that the bending strength at 170° C. was measured when 10 minutes passed after the display temperature of the environmental tester TCE-N300 reached 170° C., with each test piece set on TCE-N 300.

The test results of the bending strength performed on the test pieces of Examples and Comparative Examples are shown in Table 1 and Table 2. Further, based on the test results of the bending strength, the bending strength properties of Examples and Comparative Examples were evaluated according to the following criteria.

A: The bending strength at room temperature is 218 MPa or more, and the bending strength at 170° C. is 182 MPa or more.

B: The bending strength at room temperature is 200 MPa or more and less than 218 MPa, and the bending strength at 170° C. is 160 MPa or more and less than 182 MPa.

C: The bending strength at room temperature is 190 MPa or more and less than 200 MPa, and the bending strength at 170° C. is 150 MPa or more and less than 160 MPa.

D: The bending strength at room temperature is 130 MPa or more and less than 190 MPa, and the bending strength at 170° C. is 90 MPa or more and less than 130 MPa.

E: The bending strength at room temperature is less than 130 MPa, and the bending strength at 170° C. is less than 90 MPa.

TABLE 1

| Item | | Unit | Example 1 | Example 2 | Example 3 | Example 4 |
|---|---|---|---|---|---|---|
| Novolac-type phenolic resin: Lignin derivative | | — | 100:5.5 | 100:11 | 100:33 | 100:66 |
| Weight-average molecular weight of novolac-type phenolic resin | | — | 1430 | 1430 | 1430 | 1430 |
| External appearance | | — | Good | Good | Good | Good |
| Room temperature | Bending strength | MPa | 195 | 210 | 220 | 200 |
| | Distortion | % | 1.08 | 1.15 | 1.21 | 1.13 |
| 170° C. | Bending strength | MPa | 155 | 170 | 185 | 163 |
| | Distortion | % | 1.09 | 1.15 | 1.28 | 1.13 |
| Comprehensive evaluation | | — | C | B | A | B |

| Item | | Unit | Example 5 | Example 6 | Example 7 | Example 8 |
|---|---|---|---|---|---|---|
| Novolac-type phenolic resin: Lignin derivative | | — | 100:33 | 100:33 | 100:33 | 100:100 |
| Weight-average molecular weight of novolac-type phenolic resin | | — | 1360 | 1120 | 2480 | 2900 |
| External appearance | | — | Good | Good | Good | Good |
| Room temperature | Bending strength | MPa | 212 | 202 | 216 | 193 |
| | Distortion | % | 1.16 | 1.11 | 1.18 | 1.03 |
| 170° C. | Bending strength | MPa | 180 | 164 | 178 | 150 |
| | Distortion | % | 1.15 | 1.09 | 1.17 | 1.02 |
| Comprehensive evaluation | | — | B | B | B | C |

TABLE 2

| Item | | Unit | Comparative Example 1 | Comparative Example 2 | Comparative Example 3 |
|---|---|---|---|---|---|
| Novolac-type phenolic resin: Lignin derivative | | — | 100:0 | 100:33 | 100:150 |
| Weight-average molecular weight of novolac-type phenolic resin | | — | 1430 | 7240 | 1430 |
| External appearance | | — | Good | Good | Good |
| Room temperature | Bending strength | MPa | 185 | 137 | 90 |
| | Distortion | % | 1.04 | 0.73 | 0.48 |
| 170° C. | Bending strength | MPa | 125 | 98 | 58 |
| | Distortion | % | 1 | 0.91 | 0.6 |
| Comprehensive evaluation | | — | D | D | E |

As can be seen from Table 1 and Table 2, all of Examples 1 to 8 exhibited a high bending strength both at room temperature and 170° C., and had a higher bending strength than the molded product of Comparative Example 1 in which the resin component is composed of only a novolac-type phenolic resin (I). On the other hand, the bending strength both at room temperature and 170° C. was lower in Comparative Example 2 using a novolac-type phenolic resin having a weight-average molecular weight of greater than 3000, and Comparative Example 3 in which the content of a lignin derivative is greater than the content of a novolac-type phenolic resin, as compared with Comparative Example 1.

INDUSTRIAL APPLICABILITY

The molded product formed using a lignin resin composition obtained by the present invention has a high bending strength at 170° C. as well as at room temperature. Therefore, such a lignin resin composition can be used as a the thermosetting resin substituting a phenolic resin and thus has an industrial applicability.

The invention claimed is:

1. A lignin resin composition comprising:
   a lignin derivative having a weight-average molecular weight of 500 or more and 4000 or less; and
   a phenolic novolac resin having a weight-average molecular weight of 1000 or more and 3000 or less,
   wherein the content of the lignin derivative is not higher than the content of the phenolic novolac resin.

2. The lignin resin composition according to claim 1, wherein the weight ratio of the lignin derivative to the phenolic novolac resin is 5:95 to 50:50.

3. The lignin resin composition according to claim 1, wherein the lignin derivative is solvent-soluble.

4. The lignin resin composition according to claim 1, wherein the solvent is a polar solvent.

5. The lignin resin composition according to claim 1, wherein the softening temperature of the phenolic novolac resin is 60° C. or higher and 95° C. or lower.

6. The lignin resin composition according to claim 1, which is formed by melt-mixing the lignin derivative and the phenolic novolac resin at a temperature of 60° C. or higher and 250° C. or lower in advance.

7. A cured product obtained by adding hexamethylenetetramine to the lignin resin composition according to claim 1, followed by curing.

8. A molded product having the cured product according to claim 7.

* * * * *